Patented Aug. 1, 1933

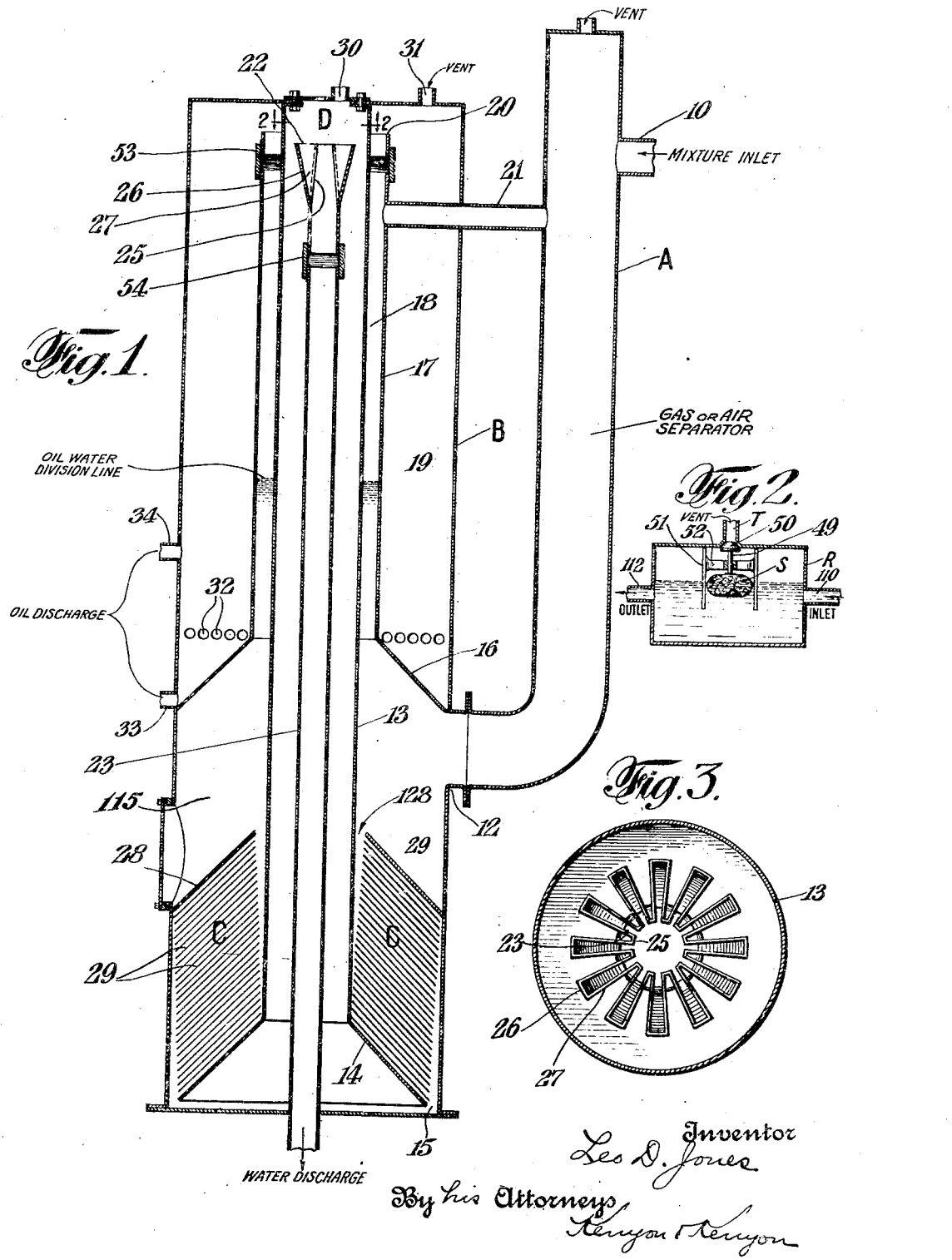

1,920,468

UNITED STATES PATENT OFFICE 1,920,468

SEPARATION OF IMMISCIBLE LIQUIDS

Leo D. Jones, Philadelphia, Pa., assignor to The Sharples Specialty Company, Philadelphia, Pa., a Corporation of Delaware Application May 23, 1928. Serial No. 279,918

10 Claims. (Cl. 183—3)

This invention relates to the separation of immiscible liquids, such as the separation of oil and oily products from mixtures thereof with water and it includes features that are of particular advantage in the separation of oil and oily substances from bilge and ballast water of ships.

In the separation of large quantities of mixtures of immiscible substances into their constituents it is an advantage to flow the mixture continuously through a separating operation instead of attempting to effect the separation of the entire body of mixture at one time as by mere settling. In such an operation it is of advantage to provide for the continuous discharge of the separated constituents and to carry out that discharge in such a manner that the separating operation is not interferred with. In such continuous separation there is constant flow of the mixture and its separated constituents, and the flow, particularly of the mixture, must be of such nature that separation will occur, as by preserving quiescence and avoiding turbulence. Weirs are advantageously employed to provide for and to control continuous discharge of the separated constituents in proper proportions. Where the separation occurs while the mixture is in motion other than mere flow through the operation, as in the separating of oil from ballast and bilge water on ships at sea, the functioning of such weirs is best maintained by locating in close proximity the weirs that respectively control discharge of separated constituents. And, under such conditions the dividing line between the separated constituents must be reduced to a small area to prevent remixing; and the dividing line is advantageously maintained in a narrow passage leading to one of the weirs and of such height that no pitching of the ship will displace it to a point of the apparatus having large horizontal area.

Moreover, account must be taken of the effect of crests above such controlling weirs. To prevent the formation or existence of crests of such depth that equilibrium between the bodies of separated constituents and the location of the dividing line are disturbed, the weir on which a crest is likely to occur must be of considerable length, and in separators employed on shipboard such long weirs must be arranged in small horizontal area and close to any other discharge controlling weir and preferably symmetrical thereto. When long narrow passages lead to the discharge-controlling weirs, the mixture introduced into the separator must be free of gases or air that would destroy the balancing effect of the liquid columns in those passages. Separators for removing gas and air from the mixture must so operate that the gas and air will separate from liquids and will not be entrained in the liquids because of the flow thereof; and withdrawal of the separated gas or air must not be prevented by an accumulation or solidification of a liquid constituent that may separate from the mixture in the gas separator. Moreover advantage is gained by effecting a bulk or coarse separation that eliminates a major portion of one constituent and then effecting a more complete or fine separation of the constituents; and the gas separating and bulk or coarse separating operations may be carried out wholly or in part together and even in the same element of the apparatus.

My invention is directed to a method and apparatus for separating mixtures of immiscible liquids, that may be mixed also with gas or air, in which steps or features are included whereby one or more of the desirable conditions or advantages above described are attained in the separating operation. Other objects, and advantages of my invention are set out in this description or will be apparent, in the light of this description, to those skilled in the art.

In the drawing in which like reference characters indicate similar parts,

Fig. 1 is a diagrammatic vertical section of apparatus embodying my invention and whereby my process may be practised;

Fig. 2 is a partial sectional view on the line 2—2 of Fig. 1; and

Fig. 3 is a diagrammatic showing partly in vertical section of a modified form of gas or air separating element.

With the understanding that my invention and the practice thereof are not limited to the construction shown in the drawing but with the understanding that the construction shown in the drawing is merely illustrative, it is pointed out that in the drawing there is shown an element or chamber A to which the mixture is fed and in which gas or air is separated from the mixture and discharged, and a tank or casing B to which mixture is passed from chamber A and from which the separated liquid constituents are discharged. There may be in chamber A some coarse or bulk separation of one liquid constituent from the other or from the mixture and a flow of such separated constituent to tank B separate from the flow of mixture to tank B. In tank B a bulk or coarse separation of the liquid constituents occurs, and a fine and substantially complete separation also occurs therein at C where the liquid is quiescent or at least flows substantially without turbulence and at a relatively low velocity; and a separated constituent is discharged from tank B at D by flowing over a weir that is of greatly extended length but of relatively small horizontal spread and substantially all parts of that weir are in close relation to the weir that controls the discharge of the other separated constituent.

With the understanding that my invention is not limited thereto, although it is well adapted to such an operation, my invention is described in connection with the separation of oil from ballast and bilge water to facilitate an understanding of the construction and operation and practice thereof. A mixture of ballast or bilge water and oil and perhaps air or gas is pumped into inlet 10 of chamber A. The inlet 10 is preferably at or near (slightly above or below) the level of liquid maintained therein by the discharge weirs hereinafter described. Thus but little separated liquid may accumulate above the inlet point and not enough to prevent free rise of gas or air even though such liquid has a tendency to solidify and impede such action. Separated air will pass off through vent 11; and inasmuch as the entering liquid does not fall, or falls only a very slight distance, upon the surface of the liquid in chamber A there will be no entraining of gas or air within the liquid in chamber A. A lower level of chamber A communicates with inlet 12 that leads to a lower, or intermediate, level of the interior of tank B and into zone or compartment 115 thereof having a horizontal area that is relatively large. A partition 13 which is cylindrical in the embodiment shown extends from the top of tank B to a point near the bottom thereof; and in the embodiment shown the lower end of partition 13 extends downwardly in the form of a frusto-conical member 14 leaving a passage 15 between the lower edge of member 14 and the inner wall of tank B. A lighter constituent such as oil, or oily material, including emulsion, rises in the compartment 115 which is located between the partition 13 and the side walls of tank B and a heavier constituent such as water moves downwardly in compartment 115.

A frusto-conical partition 16 extending inwardly from the wall of tank B forms the top of compartment 115 and causes compartment 115 to contract upwardly, and a partition 17 that is cylindrical in the embodiment shown is joined to partition 16 and forms with partition 13 an upwardly extending relatively long annular passage 18 in which the oil rises until it passes over weir 20 at the upper edge of partition 17 and falls into compartment 19 formed by the side walls of chamber B and partitions 16 and 17. Also, oil rising in chamber A may pass through pipe 21 leading from an upper point of chamber A to passage 18.

Water descending in compartment 115 passes through passage 15 and rises within partition 13 and passes over weir 22 into pipe 23 and is carried out of tank B by pipe 23 which may extend downwardly within partition 13 and through the bottom of tank B. The relative levels of weirs 20 and 22 are so fixed or adjusted, either of those weirs being constructed for adjustment, that the dividing line between oil and water will lie in relatively long but relatively narrow passage 18, the column of water between the weir 22 and the lower edge of partition 14 balancing the column of water and the column of oil between the lower edge of partition 14 and weir 20. The position of weirs 20 and 22 is such that the level of liquid in chamber A is maintained at or near the level of, and preferably above, inlet 10.

A weir over which a large quantity of liquid will flow, for example the weir over which water flows in the separation of oil from ballast or bilge water, such as the weir 22, is an "extended" weir by which is meant a weir of great effective length but of relatively small horizontal dimension. In the embodiment shown weir 22 is generally circular but is substantially sinuous, crossing and recrossing a substantially true circle to the end that its actual and effective length is many times greater than a circle enclosing even the outermost points of the weir.

In the embodiment shown weir 22 is formed at the top of pipe 23 by means of inwardly inclined inner members 25 and outwardly inclined outer members 26 joined by radial members 27. The upper edges of members 25, 26, and 27 are all in substantially the same horizontal plane and constitute together the effective edge of weir 22, which edge is of great extent and thereby insures little change of effective level of weir 22 by reason of the crest of liquid thereon, even though substantially great changes are made in the rate of flow of liquid over the weir. However, the horizontal extent of the extended weir is relatively small in any direction. My invention is not limited to a weir of generally circular configuration because the same principles may be applied to weirs of other general configuration; and the number and shape may be varied of the convolutions whereby extension of the weir is obtained without great horizontal dimensions. The weir need not be continuous.

Moreover, it will be observed that the weirs control flow from relatively long passages of small horizontal dimension and that they are arranged symmetrically with respect to one another and with respect to the main separating compartment, and that the weirs are close together and are both contained in an area of relatively small horizontal dimension regardless of the horizontal dimensions of the chambers from which the weirs control discharge of liquid.

Compartment 115 is of relatively large dimension causing reduction of velocity of flow of the incoming liquid, and it is a feature of my invention that the liquid flows without turbulence that would interfere with the separation. To this end there is shown at C means whereby a flowing body of liquid is divided into streams of small cross-section.

Threaded couplings 53 and 54 provide for adjustment of the levels of weirs 20 and 22 respectively.

Thus, in the embodiment of my invention shown in the drawing there is a frusto-conical partition 28 extending from the wall of tank B to a point near cylindrical partition 13 leaving a passage 128 therebetween; and between partitions 14 and 28 are located nested but spaced frusto-conical partitions 29 which form narrow passages through which flows liquid passing from chamber 115 to the interior of partition 13. The flow in these narrow passages will be without turbulence and oil or other lighter constituent arising therein will pass along the under sides of partitions 29 and escape through passage 128, fine particles of oil agglomerating to form larger globules capable of rising rapidly to weir 20. To assure equal flow successively lower partitions 29 have their inner edge located at points successively closer to partition 13 and their outer edges located at points successively farther from the wall of tank B.

Vents 30 and 31 in the top of tank B insure an equalization of air pressure on the top of the water and oil columns.

Oil or oily material collected in compartment 19 may be heated therein, as by steam coil 32, and withdrawn therefrom by pipes 33 or 34 or by both pipes and further treated as desired, it being advantageous to pass such oil to a centrifuge as proposed in my Patent No. 1,586,449, the continuous gravity separator shown herein being suitable for use in the complete apparatus described in that patent.

While I have described in considerable detail apparatus embodying my invention and the operation thereof in the practice of my invention, I do not intend that I shall be limited to such details but that my invention shall include such modifications and variations as fall within the hereunto appended claims.

In this connection it is pointed out that in chamber A the mixture inlet is near, and preferably below, the level of liquid maintained by the weirs and the main liquid outlet 12 is well below the mixture inlet. It is also pointed out that the separation of finer globules of oil, effecting a final and more complete separation occurs in the area C of the separator and a bulk or coarse separation occurs in the compartment 115 and may also occur in chamber A and the gas separation occurs in chamber A, while the several bodies of mixture and separated constituents are maintained in liquid balance by the same weirs 20 and 22. It is also pointed out that many features of my invention are particularly adapted to the separation of oil and oily substances from bilge and ballast water on shipboard. Thus, the provision of a long passage 18 leading to the oil weir and the proper adjustment of the levels of the weirs insures that the division line between oil and water will be maintained in that restricted passage and remixing will not occur because of rolling of the ship. Likewise, several features of the weirs prevent rolling of the ship from interfering with proper and uniform operation. Thus, concentric arrangement of the weirs and the extension in a horizontal direction of the weir controlling discharge of water, prevent wide variations in the crests on that weir, and the concentration of that extended weir in small horizontal area causes a major portion of the weir to remain effective in spite of rolling of the ship, it being obvious that very little of a weir of equal length extending across the ship would be effective if the ship were rolling. Also the location of the weirs in close proximity, in cooperation with the symmetrical arrangement of the weirs, insures proper operation in spite of the rolling of the ship.

Within the spirit of my invention the form of the air or gas separating apparatus may be modified, for example as shown in Fig. 3 wherein a tank R is provided with a mixture inlet 110 and a mixture outlet 112 that may lead into the tank B at 12, the conduit 21 being closed in such case. In this construction the vent T of the tank R is controlled by a float S having a stem 49 which carries a valve 50 that controls the vent, the float being constrained by the guides 51 and the stem of the float being constrained by the guides 52. The float is so proportioned that the rising and falling thereof so controls the vent T that the liquid level is always near to and preferably slightly above the level of inlet 110 and always above outlet 112. The general configuration of the apparatus is well adapted to the embodiment thereof within a ship and the specific features of construction of the apparatus will perform the intended and necessary functions within such especially suitable configuration.

I claim:

1. An apparatus for the separation of a mixture of immiscible liquids, a first chamber having a mixture inlet near and below the liquid level therein and being provided with a vent above said liquid level for the discharge of entrained gas, a second chamber communicating at a lower level thereof with a lower level of said first chamber, an upwardly extending passage for a lighter constituent leading from said second chamber, a conduit leading from an upper level of said passage to an upper level of said first chamber, and a passage for a heavier constituent leading from a lower level of said second chamber.

2. In apparatus for the separation of a mixture of immiscible liquids, a chamber, a partition dividing said chamber into inner and outer compartments communicating adjacent the bottom of the chamber, a second partition surrounding said first partition and forming therewith a passage leading from an upper level of said chamber, a weir within the compartment formed by said first partition and controlling flow of a heavier constituent from said compartment and a weir at the upper end of said second partition and controlling discharge of a lighter constituent and so positioned with respect to said first weir as to maintain a dividing line between the constituents of the mixture within the passage between said partitions.

3. An apparatus for the separation of mixtures of immiscible liquids, a separating chamber having a central opening in the top thereof, a passage leading upwardly from said central opening and having a weir at its top for the control of the discharge of the lighter constituent, a second passage within said first passage and extending to a point near the bottom of said chamber, and an annular weir within said second passage, and means for conducting away heavier constituents flowing into said annular weir.

4. In apparatus for the separation of immiscible liquids, a vented chamber having a mixture inlet, a second chamber having an inlet, liquid-balance controlled means for separately discharging separated constituents from said second chamber and maintaining a liquid level in said second chamber above the inlet thereof, and having means for effecting coarse separation of said liquids and means for effecting fine separation of said liquids both between said inlet and said discharging means, and a liquid conduit leading from a lower level of said vented chamber to the inlet of said second chamber, whereby the liquid is maintained under liquid-balance during separation of gas and coarse separation and fine separation of liquids.

5. In a gravity separator for a mixture of immiscible liquids, a container having a mixture inlet, a conduit for conducting one constituent of said mixture from said container and extending upwardly therein from a point in said container below said inlet, and a nest of frustoconical plates in said container below said inlet and surrounding said conduit and spaced to provide passages of limited vertical dimension between said inlet and the point in said container from which said conduit extends upwardly.

6. In a gravity separator for a mixture of immiscible liquids, a container having a mixture inlet, a conduit for conducting one constituent of said mixture from said container and extending upwardly therein from a point in said container below said inlet, and a nest of frusto-conical plates in said container below said inlet and surrounding said conduit and spaced to provide passages of limited vertical dimension between said inlet and said point, the periphery of the uppermost of said plates engaging the inner wall of said container and the inner edge of the lowermost of said plates engaging said conduit.

7. In a gravity separator for a mixture of immiscible liquids, apparatus comprising a gas-separating compartment having a vent leading from an upper level thereof and having a mixture inlet, a coarse separating compartment, and a fine separating compartment, said apparatus being provided with weirs, positioned substantially below said vent for the control of the discharge of separated constituents from the two last-mentioned compartments, said compartments being in communication at points wholly below the level of the lowermost of said weirs.

8. In a gravity separator for a mixture of immiscible liquids, a container having a mixture inlet, a conduit leading upwardly from a point in said container below said inlet for conducting one constituent of said mixture from said container, a nest of frustro-conical plates in said container and separated to provide settling passages of limited vertical dimension sufficiently large to permit the entry of an oil and water-mixture therebetween and allow settling thereof in said passages, said passages extending between said inlet and the point in said container from which said conduit leads, and weirs controlling the separate discharge of liquids from the separator.

9. In a gravity separator for a mixture of immiscible liquids, apparatus comprising a gas separating compartment of substantial extent in horizontal cross-section having a vent leading from an upper level thereof and having a mixture inlet at a level below said vent, a liquid separating chamber communicating with said gas separating compartment through a conduit extending therebetween and means for controlling discharge levels of separated liquid constituents from said separating chamber, said conduit interconnecting the gas separating compartment and separating chamber extending entirely below said last named means, whereby the hydrostatic balance between the liquids in the separating chamber and the liquid in the gas separating compartment maintains the liquid in said gas separating compartment at a level below said vent.

10. In a gravity separator for a mixture of immiscible liquids, a separating compartment, separate discharge passages for receiving separated constituents passing from said compartment and annular weirs controlling the level of liquids in said discharge passages in balance against each other, one of said annular weirs being arranged within the other in close lateral proximity thereto, and said weirs being confined within a relatively small area, one of said weirs being of tortuous configuration whereby to afford a relatively extensive periphery as compared with a corresponding cylindrical weir enclosing a similar area.

LEO D. JONES.